United States Patent [19]

Glick et al.

[11] 4,373,944
[45] Feb. 15, 1983

[54] REMOVAL OF GLASS PARTICLES FROM GLASS ARTICLES

[75] Inventors: Frederick J. Glick, Williamstown; Richard N. Pedersen, Vineland, both of N.J.

[73] Assignee: Owens-Illinois, Inc., Toledo, Ohio

[21] Appl. No.: 291,601

[22] Filed: Aug. 10, 1981

[51] Int. Cl.³ ............................................. C03C 19/00
[52] U.S. Cl. ............................................ 65/23; 65/35; 65/61; 65/87; 83/880; 134/1
[58] Field of Search ................... 65/17, 23, 35, 61, 87, 65/105; 134/1, 22.11, 22.12, 37; 83/880

[56] References Cited

U.S. PATENT DOCUMENTS 2,968,584 1/1961 Dickey ..................................... 134/1
3,071,497 1/1963 Hinson .................................... 134/1
3,729,302 4/1973 Heaton ................................. 65/87 X
4,326,553 4/1982 Hall ..................................... 134/1 X

FOREIGN PATENT DOCUMENTS 1060973 3/1967 United Kingdom ..................... 65/35

Primary Examiner—Robert L. Lindsay, Jr.
Attorney, Agent, or Firm—Richard D. Heberling; Myron E. Click; David H. Wilson

[57] ABSTRACT

In the method of making hollow glass articles wherein the article is subjected to an operation such that glass particles are deposited and held on the interior of the glass article, the method of removing such particles which comprises contacting the glass article with a resonator of an ultrasonic generator system and subjecting the article to ultrasonic vibrations from the ultrasonic generator.

9 Claims, 2 Drawing Figures

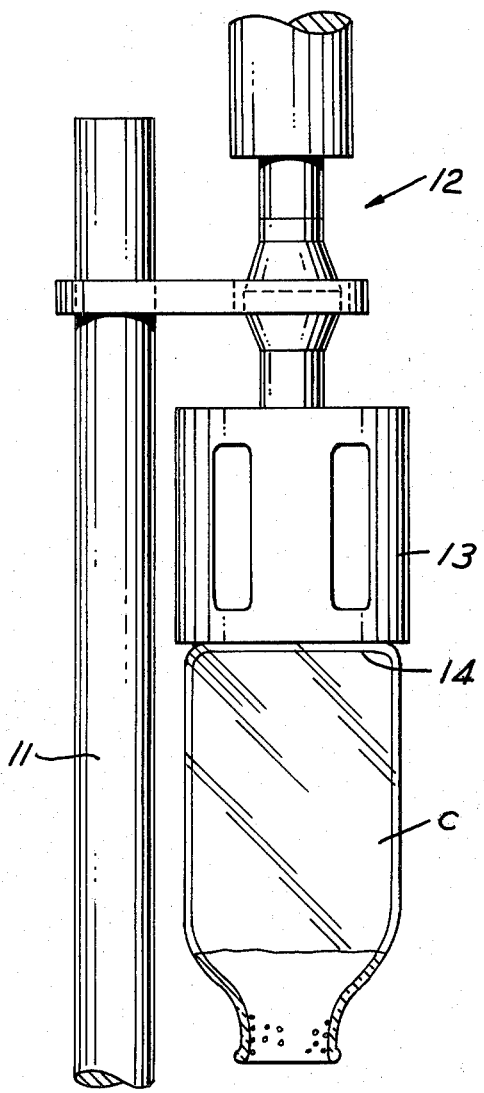
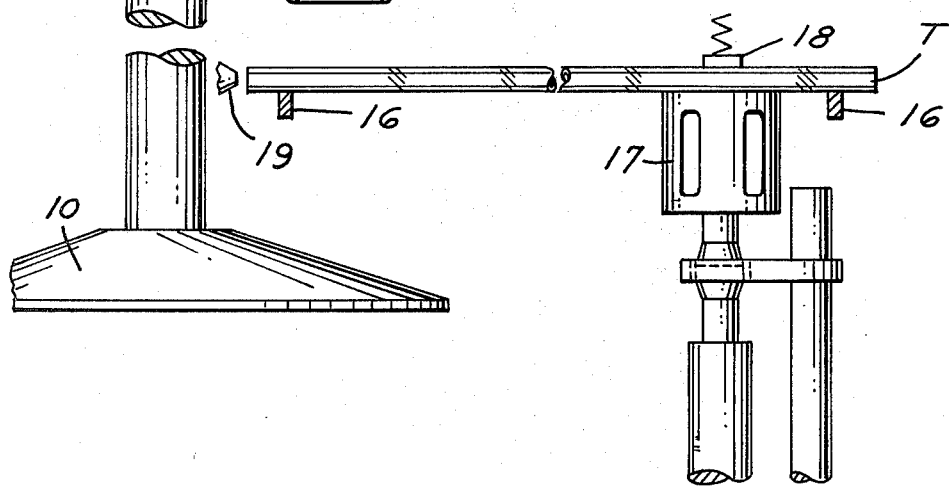

REMOVAL OF GLASS PARTICLES FROM GLASS ARTICLES

This invention relates to the manufacture of hollow glass articles and particularly to the removal of glass particles which result from the method of manufacture of the articles.

BACKGROUND AND SUMMARY OF THE INVENTION

In the manufacture of hollow glass articles, it is often necessary to sever the article and in the step of severing, small glass particles may be deposited on the interior of the articles. Typical arrangements where such particles occur are in the manufacture of hollow articles by the well known paste mold process wherein a moil is broken or severed from the remainder of the glass. In such a process the particles of greatest concern may be on the order of 0.010 inch or larger. Particles may also be produced in the manufacture of glass tubing wherein the tubing is severed into lengths by scoring and cracking. In such a process the particles of concern may be on the order of 0.020 inch or smaller. Heretofore, it has been common to utilize air to attempt to purge the particles from the interior of the article. Such a method of removal is not as effective as may be desired and, in the case of hollow articles, has the additional disadvantage of possibly weakening the resistance of the article to impact.

Accordingly, among the objectives of the present invention are to provide an effective method of removal of glass particles from hollow glass articles.

In accordance with the invention, the method of removing such particles comprises contacting the glass article with a resonator of an ultrasonic generator system and subjecting the article to ultrasonic vibrations.

DESCRIPTION OF THE DRAWINGS

FIG. 1 is an elevational view of an apparatus utilized in performing the method embodying the invention.

FIG. 2 is an elevational view of another apparatus utilized in a modified method.

DESCRIPTION p Referring to FIG. 1, in accordance with the invention, a hollow glass container C such as a carafe or an ampule having a closed base, a side wall and an open end is oriented in an inverted position and the resonator or horn of an ultrasonic generator system is brought into engagement with the base of the article.

Ultrasonic vibration is applied momentarily to the article and, as a result, the glass particles in the article are disloged and fall out of the open end of the article. p In the case of hollow articles, it has been found that optimum results are achieved when the cross sectional area of the horn is greater than the cross sectional area of the base of the item.

Tests that have been run indicate that not only does the method result in removal of the glass particles but, in addition, the efficiency of the removal is greater than heretofore obtained by utilizing air to purge the particles.

It has further been found that the strength of the resultant hollow article is not adversely affected by the removal step, as occurs in the case of an air purge.

It has further been found that optimum results are achieved when the hollow glass article is subjected to the removal before the final heat treatment or annealing of the article in a lehr or the like. The articles are preferably hot for optimum results, for example, at 900° F.

As shown in FIG. 1, the apparatus comprises a stand having an upright 11 for supporting an ultrasonic generator device 12 that has a resonator or horn 13 with a flat bottom surface 14 which is contacted by the bottom of the container C. In use, the inverted container is brought into engagement with the horn 13 and subjected to the ultrasonic vibrations transmitting through the horn 13 directly to the container.

A device for producing satisfactory results is manufactured by Branson Sonic Power Company, Danbury, Conn., Model 350, having output power of 350 watts and frequency output of 20 kHz. Such ultrasonic generator systems comprise a generator, converter and resonator or horn and is shown in U.S. Pat. No. 4,265,842 which is incorporated herein by reference.

The method has also been found successful in the removal of glass particles in glass tubing and tubing products. As shown in FIG. 2, the lengths of tubing T are carried by a lugged conveyor 16 past the end of a resonator 17. A spring loaded plastic hold-down pad 19 holds the tubing against resonator 17. As each length of tubing T contacts the horn 17 is subjected to ultrasonic vibrations to the side wall. Since the tubing has a small opening and is horizontal, air is preferably directed by jets 18 through the other end of the tubing sufficiently to remove the dislodged particles. The tubing can be positioned horizontally or vertically or at any other angle.

If the length of tubing is long, on the order of four or five feet, the tubing is preferably moved successively past another station where the other end of each length contacts another resonator and air is directed at the other end to remove the dislodged particles.

In a typical arrangement, the resonator 17 has a length of three inches parallel to the axis of the tubing and a width of one inch perpendicular to the axis of the tubing in the direction of movement of the tubing.

It has been found that only momentary contact is required to dislodge the glass particles in hollow glass articles such as containers or tubing.

The frequency of the vibrations to which the glass articles are subjected may vary but is preferably in the range of 10–40 kHz. Improved results over air removal alone are achieved over a range of 0.5–90 kHz.

We claim:

1. In a method of making hollow glass articles wherein the articles are subjected to an operation such that glass particles are deposited on the interior of the glass article, the improvement comprising the steps of removing such particles by directly contacting the glass article with a sonic resonator and subjecting the article to sonic vibrations having a frequency of about 0.5 to 90 kHz to remove the particles.

2. The method set forth in claim 1 wherein said article is subjected to ultrasonic vibrations in the range of about 10 to 40 kHz prior to heat treatment to anneal the article.

3. The method set forth in claim 1 wherein said article comprises a container having an open end and a closed end including the step of holding said container in inverted position with the open end extending downwardly during the application of the ultrasonic vibrations having a frequency in the range of about 10 to 40 kHz.

4. The method set forth in claim 3 wherein said base of said article is engaged by said ultrasonic resonator.

5. The method set forth in claim 4 wherein the cross sectional area of the ultrasonic resonator is greater than the area of the base.

6. The method set forth in claim 1 wherein said hollow glass article comprises a length of tubing and the resonator having vibrations with a frequency of about 10 to 40 kHz is engaged with a side wall of the tubing.

7. The method set forth in claim 6 including the step of directing air longitudinally through the tubing while the tubing contacts the resonator.

8. The method set forth in claim 6 including the step of moving the tubing transversely with respect to its axis into and out of contact with the resonator.

9. The method set forth in claim 1 wherein said vibrations comprise ultrasonic vibrations in the frequency range of about 20,000 kHz.

* * * * *